United States Patent
Tsunoda

(10) Patent No.: US 7,122,267 B2
(45) Date of Patent: *Oct. 17, 2006

(54) FUEL CELL CONFIGURED WITH DISCHARGE PASSAGES THAT PREHEAT FUEL GAS AND PREVENT CROSS LEAKAGE

(75) Inventor: Tadashi Tsunoda, Tokyo (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 370 days.

This patent is subject to a terminal disclaimer.

(21) Appl. No.: 10/652,800

(22) Filed: Aug. 28, 2003

(65) Prior Publication Data
US 2004/0053108 A1    Mar. 18, 2004

(30) Foreign Application Priority Data
Aug. 28, 2002  (JP) ............................. 2002-249371
May 13, 2003   (JP) ............................. 2003-134200

(51) Int. Cl.
    *H01M 2/00*   (2006.01)
(52) U.S. Cl. ............................. 429/34; 429/38; 429/39; 429/35
(58) Field of Classification Search ................. 429/34, 429/32, 38, 39, 12, 36, 35; 204/258, 260, 204/263, 272, 275.1
See application file for complete search history.

(56) References Cited

U.S. PATENT DOCUMENTS

| | | | |
|---|---|---|---|
| 4,983,472 A * | 1/1991 | Katz et al. ................... 429/38 |
| 5,595,834 A * | 1/1997 | Wilson et al. ................ 429/30 |
| 6,361,892 B1 | 3/2002 | Ruhl et al. | |
| 6,432,567 B1 | 8/2002 | Doggwiler et al. | |
| 2003/0072989 A1 | 4/2003 | Lee et al. | |
| 2004/0028986 A1* | 2/2004 | Tsunoda ....................... 429/38 |
| 2004/0043270 A1* | 3/2004 | Tsunoda ....................... 429/32 |
| 2004/0053107 A1* | 3/2004 | Tsunoda ....................... 429/38 |

FOREIGN PATENT DOCUMENTS

| | | | |
|---|---|---|---|
| EP | 1 037 296 A1 | | 9/2000 |
| EP | 1075033 | * | 2/2001 |
| JP | 06310164 A | | 11/1994 |
| JP | 07-153479 | | 6/1995 |
| JP | 08279364 A | | 10/1996 |
| JP | 11-16581 | * | 1/1999 |
| JP | 2000-311698 | * | 11/2000 |
| WO | WO 99/57777 A1 | | 11/1999 |

* cited by examiner

*Primary Examiner*—Raymond Alejandro
(74) *Attorney, Agent, or Firm*—Lahive & Cockfield, LLP; Anthony A. Laurentano, Esq.

(57) ABSTRACT

Each of separators for sandwiching a plurality of electrolyte electrode assemblies includes a pair of plates. A fuel gas channel and an oxygen-containing gas channel are formed between the plates. A fuel gas supply hole extends through the separators for supplying a fuel gas, and discharge passages are formed around the fuel gas supply hole. The discharge passages extend through the separators for discharging an exhaust gas. The separator has a fuel gas distribution passage for connecting the fuel gas supply hole and the fuel gas channel.

6 Claims, 16 Drawing Sheets

← OXYGEN-CONTAINING GAS
← FUEL GAS

←--- FUEL GAS

FUEL CELL CONFIGURED WITH DISCHARGE PASSAGES THAT PREHEAT FUEL GAS AND PREVENT CROSS LEAKAGE

BACKGROUND OF THE INVENTION

1. Field of the Invention

The present invention relates to a fuel cell having a plurality of electrolyte electrode assemblies interposed between separators. Each of the electrolyte electrode assemblies includes an anode, and a cathode, and an electrolyte interposed between the anode and the cathode.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly. The electrolyte electrode assembly is interposed between separators (bipolar plates), and the electrolyte electrode assembly and the separators make up a unit of fuel cell for generating electricity. A predetermined number of fuel cells are stacked together to form a fuel cell stack.

In the fuel cell, an oxygen-containing gas or air is supplied to the cathode. The oxygen in the oxygen-containing gas is ionized at the interface between the cathode and the electrolyte, and the oxygen ions ($O^{2-}$) move toward the anode through the electrolyte. A fuel gas such as hydrogen-containing gas or CO is supplied to the anode. Oxygen ions react with the hydrogen in the hydrogen-containing gas to produce $H_2O$ or react with CO to produce $CO_2$. Electrons released in the reaction flow through an external circuit to the cathode, creating a DC electric current.

Generally, the solid oxide fuel cell is operated at a high temperature in the range from 800° C. to 1000° C. The solid oxide fuel cell utilizes the high temperature waste heat for internal reforming to produce the fuel gas, and generates electricity by spinning a gas turbine. The solid oxide fuel cell is attractive as it has the highest efficiency in generating electricity in comparison with other types of fuel cells, and receiving growing attention for potential use in vehicles in addition to the applications in combination with the gas turbine.

Stabilized zironia has a low ion conductivity. Therefore, the electrolyte membrane formed of stabilized zirconia needs to be thin so that oxygen ions move through the electrolyte membrane smoothly for improving the power generation performance. However, the electrolyte membrane of the stabilized zirconia can not be very thin for maintaining the sufficient mechanical strength. Therefore, it is difficult to produce a large electricity using the membrane of stabilized zirconia in the solid oxide fuel cell.

In an attempt to address the problem, Japanese Laid-Open Patent Publication No. 6-310164 (prior art 1) discloses a solid oxide fuel cell system. In the solid oxide fuel cell system, a plurality of unit cells each having a small surface area are provided on each of metallic separators, and a fuel gas supply hole and an oxygen-containing gas supply hole are formed centrally in each of the unit cells. According to the disclosure of the prior art 1, the fuel cell system has an improved reliability in which the total surface area of the cells on the separator is large, and the substrate is crack-free.

In the prior art 1, the through holes (the fuel gas supply hole and the oxygen-containing gas supply hole) are formed centrally in each of the unit cells. Further, the unit cell has a fuel gas ventilation groove or an oxygen-containing gas ventilation groove. Therefore, the mechanical strength of the unit cell is low. For example, the unit cell is likely to be damaged during the operation of the fuel cell.

Further, Japanese Laid-Open Patent Publication No. 8-279364 (prior art 2) discloses another type of solid oxide fuel cell system. As shown in FIG. 16, each of unit cells 1 is interposed between a pair of separators 2. The unit cell 1 is formed of a thin plate, and does not have any holes. The unit cell 1 and a spacer 3 around the unit cell 1 are interposed between separators 2. The separator 2 has a fuel gas inlet hole 4, an air inlet hole 5 extending in the stacking direction.

The fuel gas from the fuel gas inlet hole 4 flows through a fuel gas distribution passage 6, and is supplied to a central region of one surface of the unit cell 1. The air from the air inlet hole 5 flows through an air distribution passage 7, and is supplied to a central region of the other surface of the unit cell 1.

According to the disclosure, since the unit cell 1 is formed of a thin plate, and does not have any holes, the mechanical strength of the unit cell 1 is high. The reactant gases are supplied outwardly from central regions of opposite surfaces of the unit cell 1 to the reaction areas. Therefore, the two reactant gases are separated from each other.

However, in the prior art 2, the leakage (cross leakage) of the fuel gas from the fuel gas inlet hole 4 may occur. For example, the fuel gas may undesirably reach the cathode of the unit cell 1. Therefore, the local reaction of the air and the fuel gas at the cathode would cause heat generation. Consequently, the unit cell 1 and the separators 2 may be damaged by the heat.

SUMMARY OF THE INVENTION

A main object of the present invention is to provide a fuel cell with a simple structure, in which a plurality of electrolyte electrode assemblies are suitably arranged for maintaining the desired power generation performance, and the leakage (cross leakage) of the fuel gas is reliably prevented.

According to the present invention, each of separators for sandwiching electrolyte electrode assemblies includes a first plate and a second plate stacked together in a stacking direction.

A fuel gas channel for supplying a fuel gas to anodes of the electrolyte electrode assemblies, and an oxygen-containing gas channel for supplying an oxygen-containing gas to cathodes of the electrolyte electrode assemblies are formed between the first and second plates.

A fuel gas supply hole extends through the separators for supplying the fuel gas in the stacking direction. Discharge passages are formed around the fuel gas supply hole, and extend through the separators for discharging the fuel gas and the oxygen-containing gas after reaction as an exhaust gas in the stacking direction. Further, a fuel gas distribution passage extends between the discharge passages along a surface of the separator, perpendicularly to the stacking direction for connecting the fuel gas supply hole and the fuel gas channel.

Thus, the fuel gas for reaction in the electrode electrolyte assemblies is supplied through the fuel gas supply hole in the stacking direction. The fuel gas from the fuel gas supply hole flows into the fuel gas channel through the fuel gas distribution passage in each of the separators. When the leakage of the fuel gas occurs in the fuel gas supply hole, the leaked fuel gas enters the discharge passages around the fuel gas supply hole, and does not move undesirably into the oxygen-containing gas channel. The cross leakage of the fuel gas is reliably prevented. Therefore, the reaction of the fuel gas and the oxygen-containing gas which causes local heat generation does not occur. Thus, the electrolyte electrode assemblies are not thermally damaged. If a hydrogen sensor for detecting the fuel gas is provided in the discharge passage, for example, the leakage of the fuel gas can be detected reliably with the simple structure.

The fuel gas flows through the fuel gas supply hole inside of the discharge passages. Since the hot exhaust gas flows through the discharges passages, the fuel gas is heated by the waste heat of the hot exhaust gas. The heated fuel gas flows through the fuel gas flow passage, and is supplied to the anode. This structure is particularly suitable for rapidly starting the reaction in the electrolyte electrode assemblies at the time of starting the operation of the fuel cell, and internal reforming of the fuel gas.

The discharge passages extend through a central region of the separators. Therefore, the heat of the hot discharge passages is not emitted wastefully from the outer region of the separators. The heat of the hot discharge passage is transmitted to the entire separators from the central region of the separators. Thus, the temperature distribution is uniform in each of the separators. Simply by providing seals around the discharge passages, the sealing characteristics of the fuel cell are improved efficiently. Therefore, the sealing structure is simple. Since the exhaust gas flows through only the central region of the separators, turbulence in the flow of the exhaust gas does not occur, and the exhaust gas is smoothly discharged from the fuel cell.

The fuel gas supply hole extends inside the discharge passages. Thus, the heat of the exhaust gas is reliably transferred to the fuel gas, and the temperature of the fuel gas is raised to the desirable temperature, i.e., the operating temperature of the fuel cell. Further, since the fuel gas supply hole extends through the central region of he separators, the fuel gas is uniformly supplied to each of the electrolyte electrode assemblies. Thus, the desirable power generation performance is suitably maintained.

Further, the discharge passages are connected to the exhaust gas channel formed between the separators at a position adjacent to the fuel gas channel and the oxygen-containing gas channel. Thus, the layout of the fuel cell is simple, and the dimension of the fuel cell in the stacking direction is effectively reduced. The exhaust gas channel is adjacent to the fuel gas channel and the oxygen-containing gas channel. Therefore, the heat exchanges between the hot exhaust gas and the fuel gas, and between the hot exhaust gas and the oxygen-containing gas are suitably performed.

A first protrusion is formed on the first plate, and a second protrusion is formed on the second plate, and the first protrusion and the second protrusion protrude away from each other such that the fuel gas supply hole extends through a space between the first protrusion and the second protrusion.

The fuel gas supply hole is formed only by the first plate and the second plate of the separators. Thus, the production of the fuel cell is simply performed. Since dedicated pipes or the like are not needed, the number of components of the fuel cell is small, and the number of steps for forming the first and second plates can be reduced. Further, since a space is formed between the first protrusion and the second protrusion, the heights of the first protrusion and the second protrusion can be small. Stated otherwise, when the first and second plates are formed under pressure, the amount of drawing for each of the first protrusion, the second protrusion is small. Therefore, the first plate and the second plate can be formed with a high degree of accuracy.

A seal for sealing the space is formed between the first protrusion formed on the first plate of one of the separators and the second protrusion formed on the second plate of the other of the separators. Since the seal is interposed between the first protrusion and the second protrusion, the rigidity and sealing characteristics of the fuel cell is improved.

Further, the first plate includes the first ridge and the second plate includes the second ridge. The first ridge and the second ridge protrude oppositely to the first protrusion and the second protrusion, respectively. The first ridge is in contact with the second ridge for forming the fuel gas channel and the fuel gas distribution passage between the first plate and the second plate. The fuel gas channel and the fuel gas distribution passage are formed only by the first and second plates of the separators. Thus, the production of the fuel cell is simply performed. Since dedicated pipes or the like are not needed, the number of components of the fuel cell is small, and the number of steps for forming the first and second plates can be reduced.

Further, the heights of the first and second ridges can be small. Stated otherwise, when the first and second plates are formed under pressure, the amount of drawing for each of the first and second ridges is small. Therefore, the first and second plates can be formed with a high degree of accuracy. The first and second protrusions protrude from the first and second plates oppositely to the first and second ridges, respectively. Therefore, the first and second protrusions have a high degree of rigidity. The space of the fuel gas supply hole is not deformed. The amount of the fuel gas supplied to the electrolyte electrode assemblies is constant. Further, the sealing characteristics are improved. Thus, the desired power generation performance is maintained.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
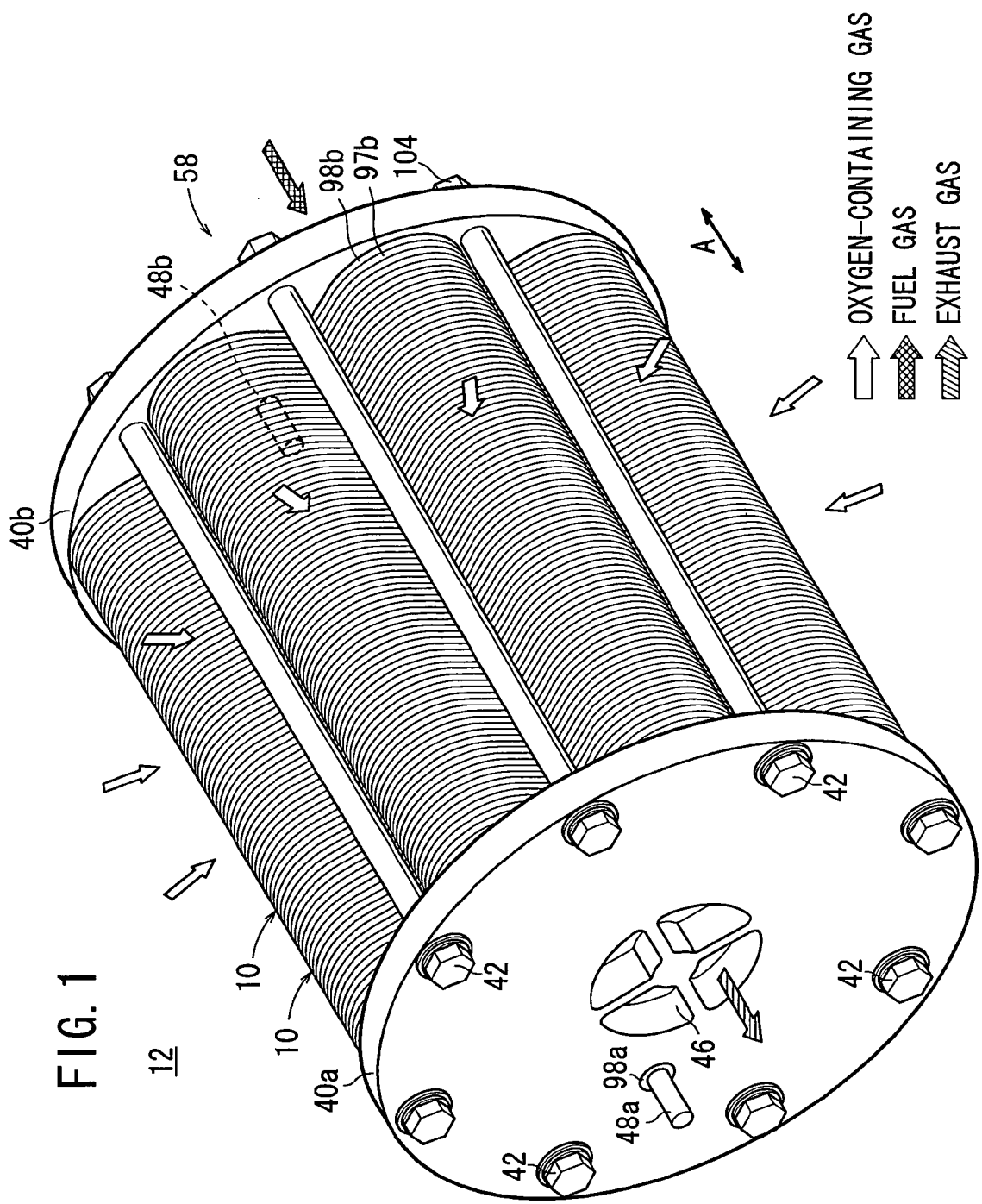
FIG. 1 is a perspective view schematically showing a fuel cell stack formed by stacking a plurality of fuel cells according to a first embodiment of the present invention.
Figure 2:
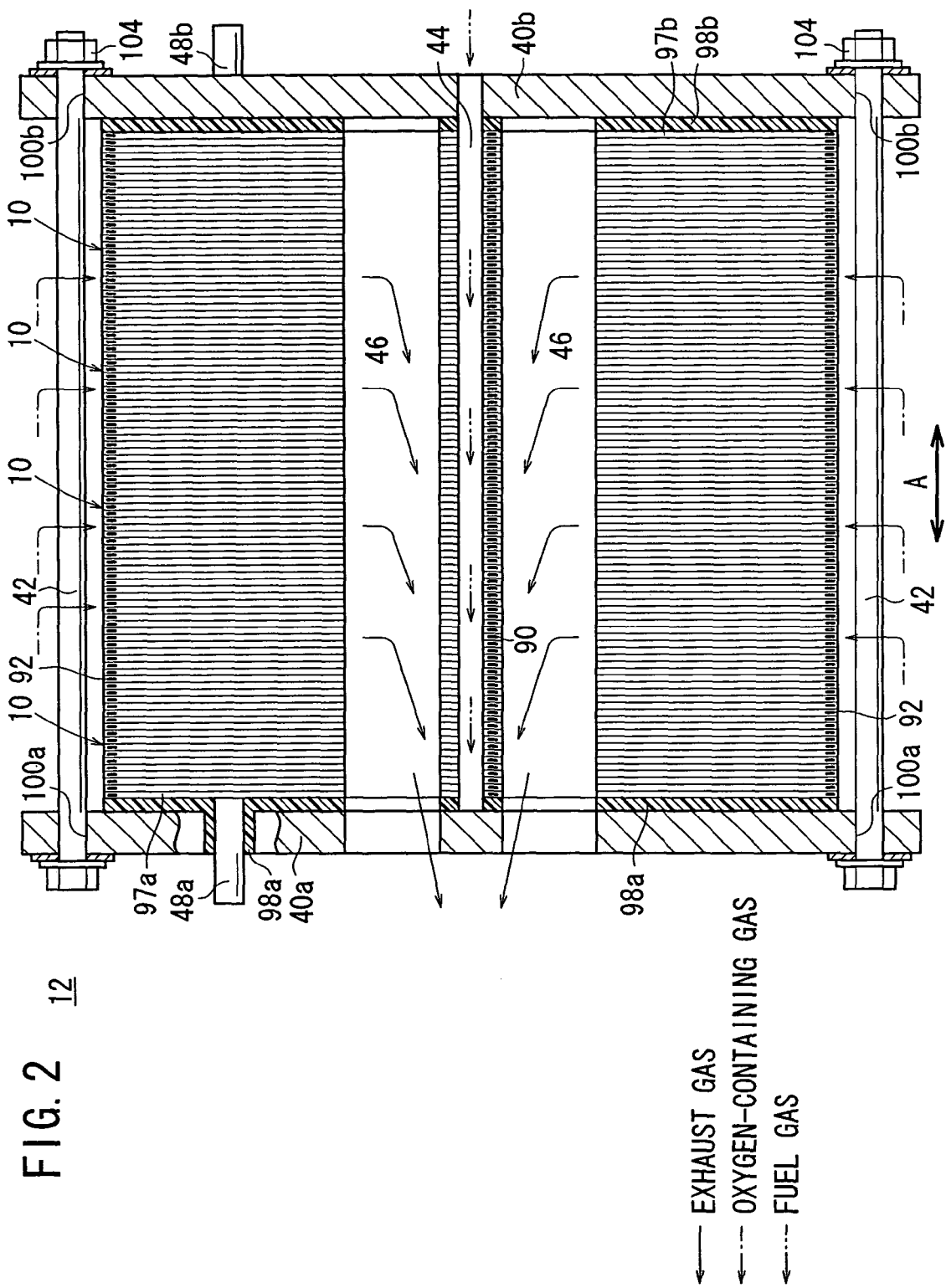
FIG. 2 is a cross sectional view showing a part of the fuel cell stack.

FIG. 1 is a perspective view schematically showing a fuel cell stack 12 formed by stacking a plurality of fuel cells 10 according to a first embodiment of the present invention, and FIG. 2 is a cross sectional view showing a part of the fuel cell stack 12.

Figure 3:
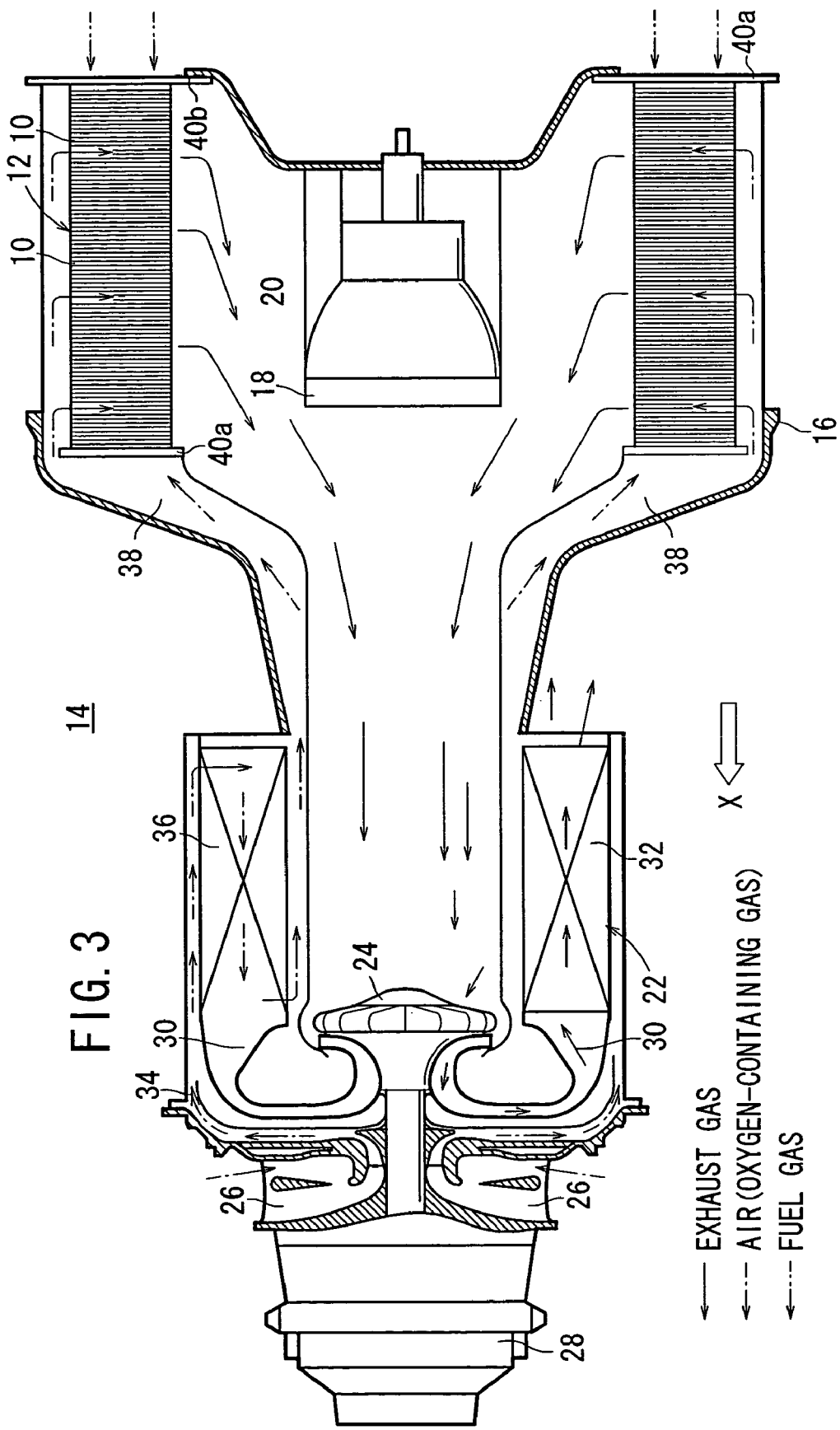
FIG. 3 is a view schematically showing a gas turbine including the fuel cell stack.

The fuel cell 10 is a solid oxide fuel cell (SOFC) for stationary and mobile applications. For example, the fuel cell 10 is mounted on vehicles. In an example of the first embodiment shown in FIG. 3, the fuel cell stack 12 is used in a gas turbine 14. In FIG. 3, the shape of the fuel cell stack 12 is different from those shown in FIGS. 1 and 2, however, the structure is substantially the same.

The fuel cell stack 12 is disposed in a casing 16 of the gas turbine 14. A combustor 18 is disposed at the center of the fuel cell stack 12. The fuel cell stack 12 discharges an exhaust gas as a mixed gas of a fuel gas and an oxygen-containing gas after reaction into a chamber 20 toward the combustor 18. The chamber 20 is narrowed in a flow direction of the exhaust gas indicated by an arrow X in FIG. 3. A heat exchanger 22 is externally provided around the chamber 20 at a forward end in the flow direction. Further, a turbine (power turbine) 24 is disposed at the forward end of the chamber 20. A compressor 26 and a power generator 28 are coaxially connected to the turbine 24. The gas turbine 14 has an axially symmetrical structure as a whole.

A discharge passage 30 of the turbine 24 is connected to a first passage 32 of the heat exchanger 22. A supply passage 34 of the compressor 26 is connected to a second passage 36 of the heat exchanger 22. The air is supplied to the outer circumferential surface of the fuel cell stack 12 through a hot air inlet passage 38 connected to the second passage 36.

As shown in FIG. 1, the fuel cell stack 12 is formed by stacking a plurality of fuel cells 10 in a stacking direction indicated by an arrow A. Each of the fuel cells 10 has a shape of a disk having a curved outer section. Flanges 40a, 40b are provided outside the outermost fuel cells 10 at opposite ends in the stacking direction, respectively. The fuel cells 10 and the flanges 40a, 40b are tightened together by a plurality of (e.g., eight) tightening bolts 42. At the center of the fuel cell stack 12, a circular fuel gas supply hole 44 is formed. The fuel gas supply hole 44 has a bottom at the flange 40a, and extends in the direction indicated by the arrow A (see FIG. 2).

A plurality of (e.g., four) discharge passages 46 are formed around the fuel gas supply hole 44. Each of the discharge passages 46 has a bottom at the flange 40b, and extends from the flange 40b in the direction indicated by the arrow A. The flanges 40a, 40b are insulated from end plates 97a, 97b by insulator plates 98a, 98b interposed between the flanges 40a, 40b, and the end plates 97a, 97b, respectively. Output terminals 48a, 48b, extend from the end plates 97a, 97b, respectively.

Figure 4:
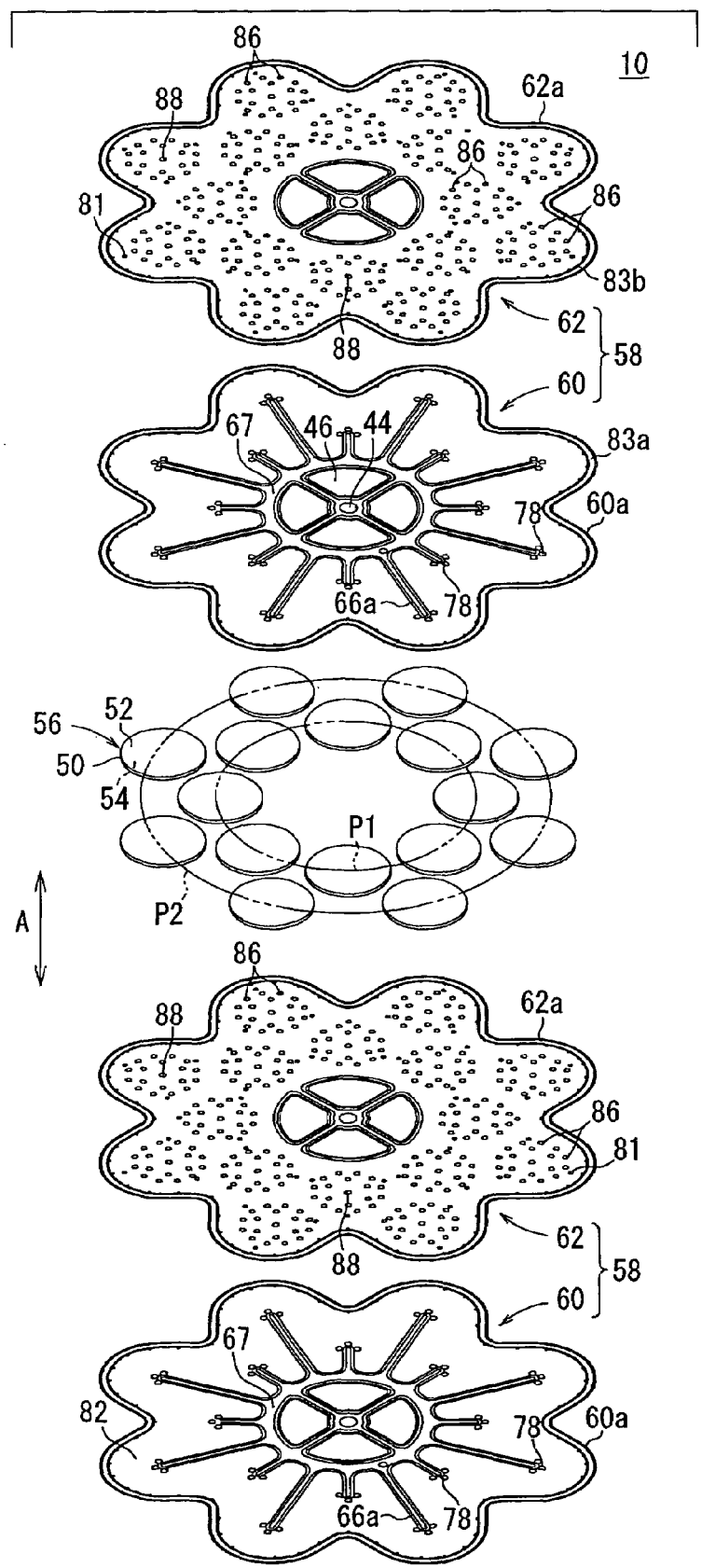
FIG. 4 is an exploded perspective view of the fuel cell.
Figure 5:
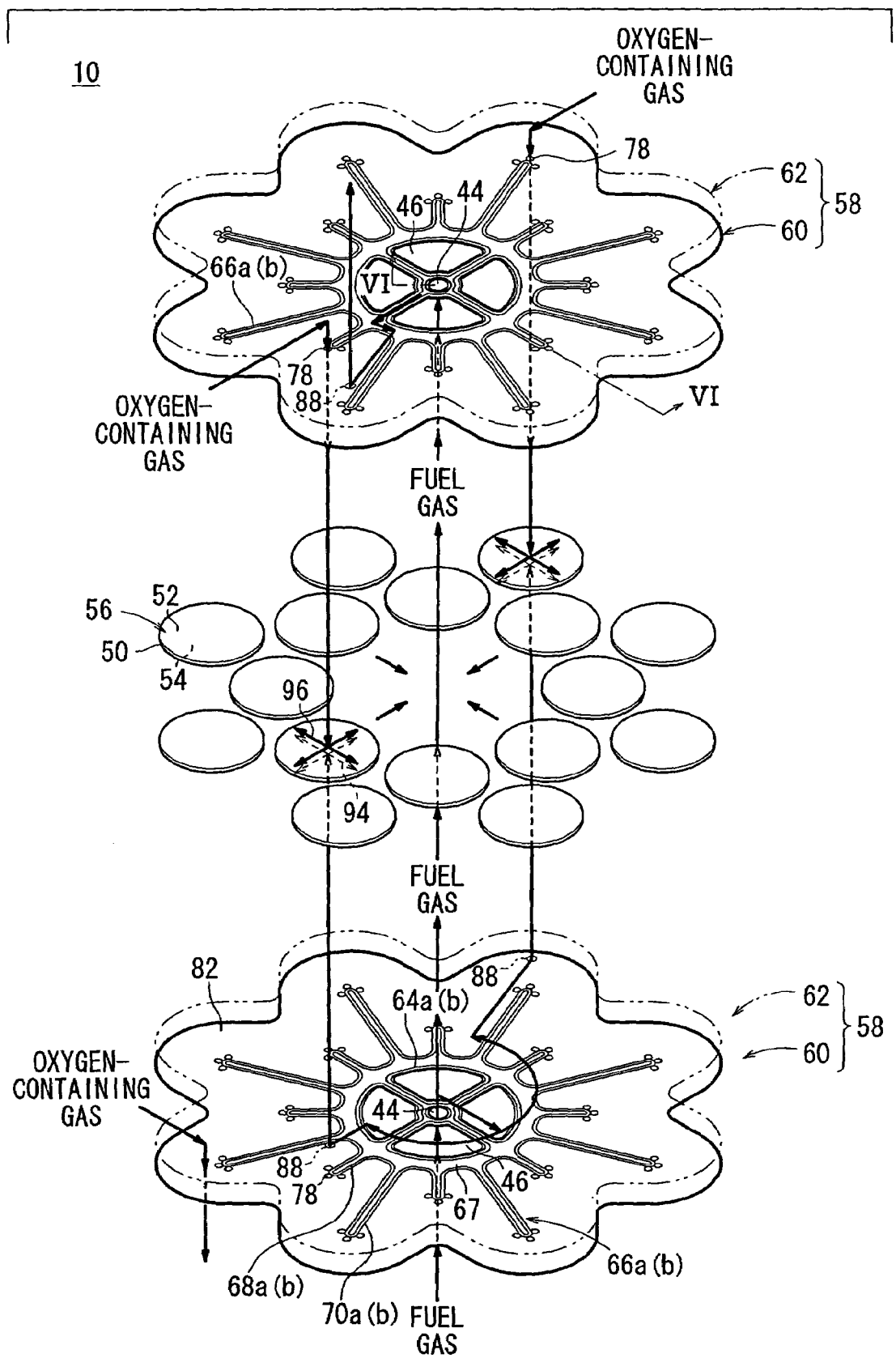
FIG. 5 is a perspective view showing a part of the fuel cell and operation of the fuel cell.

As shown in FIGS. 4 and 5, the fuel cell 10 includes electrolyte electrode assemblies 56. Each of the electrolyte electrode assemblies 56 includes a cathode 52, an anode 54, and an electrolyte (electrolyte plate) 50 interposed between the cathode 52 and the anode 54. The electrolyte 50 is formed of an ion-conductive solid oxide such as stabilized zirconia. The electrolyte electrode assembly 56 has a relatively small circular disk shape.

A plurality of (e.g., 16) the electrolyte electrode assemblies 56 are interposed between a pair of separators 58 to form the fuel cell 10. The electrolyte electrode assemblies 56 are arranged along an inner circle P1 and an outer circle P2 which are concentric with the fuel gas supply hole 44 formed at the center of the separators 58. The inner circle P1 passes through centers of eight inner electrolyte electrode assemblies 56, and the outer circle P2 passes through centers of eight outer electrolyte electrode assemblies 56 (see FIG. 4).

Each of the separators 58 includes a plurality of (e.g., two) plates 60, 62 which are stacked together. Each of the plates 60, 62 is formed of a stainless alloy, for example. Curved outer sections 60a, 62a are formed on the plates 60, 62, respectively (see FIGS. 7 and 8).

Figure 6:
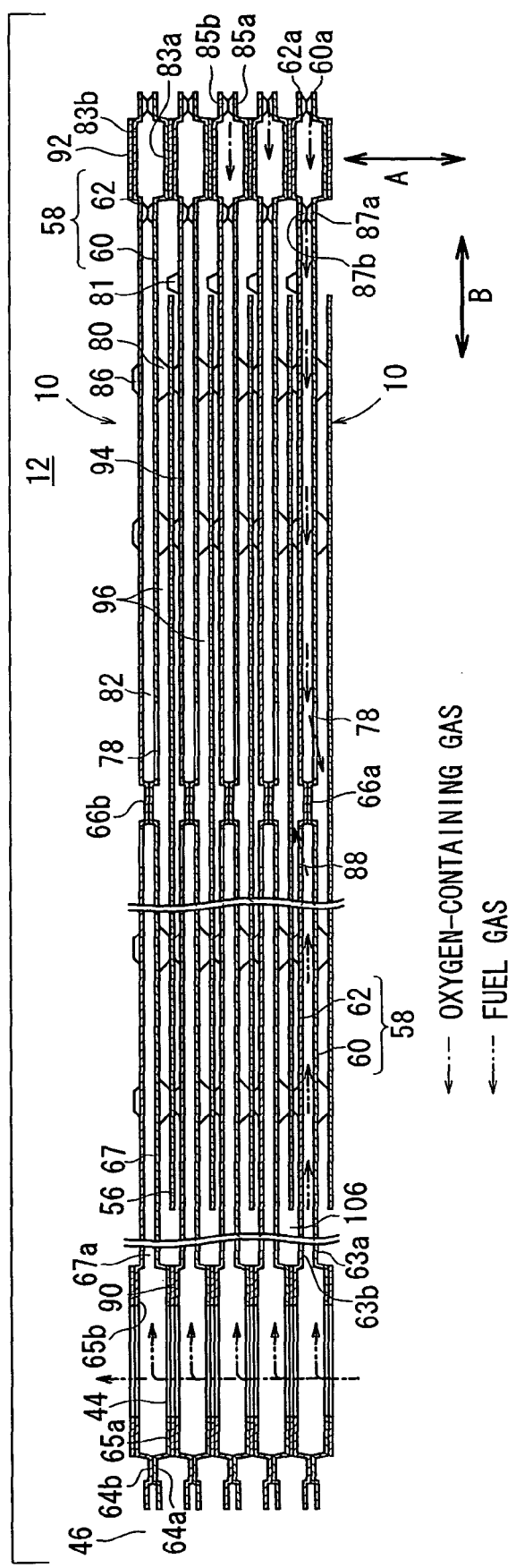
FIG. 6 is a cross sectional view, with partial omissions, showing the fuel cell stack.
Figure 7:
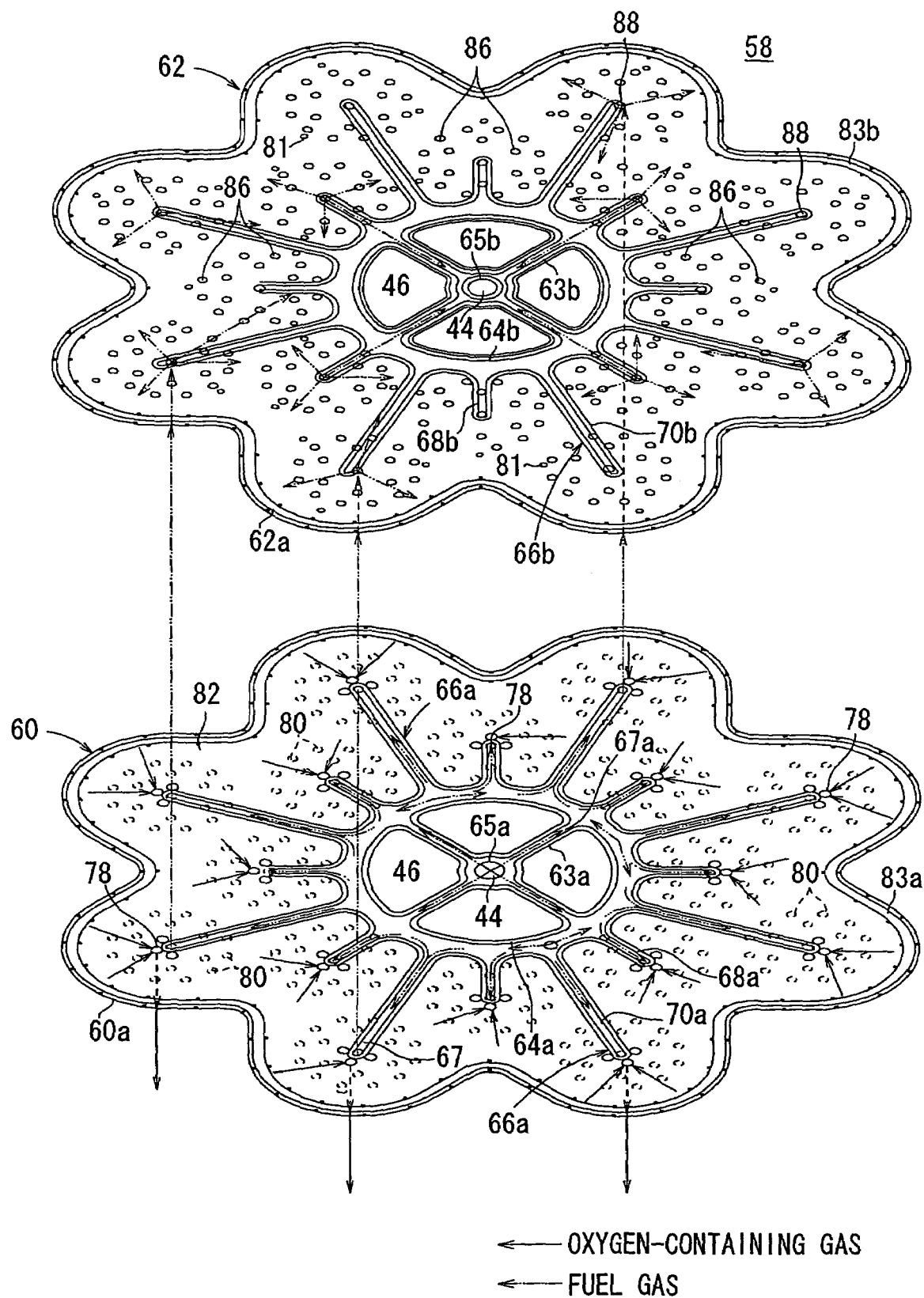
FIG. 7 is an exploded perspective view showing a separator of the fuel cell.
Figure 9:
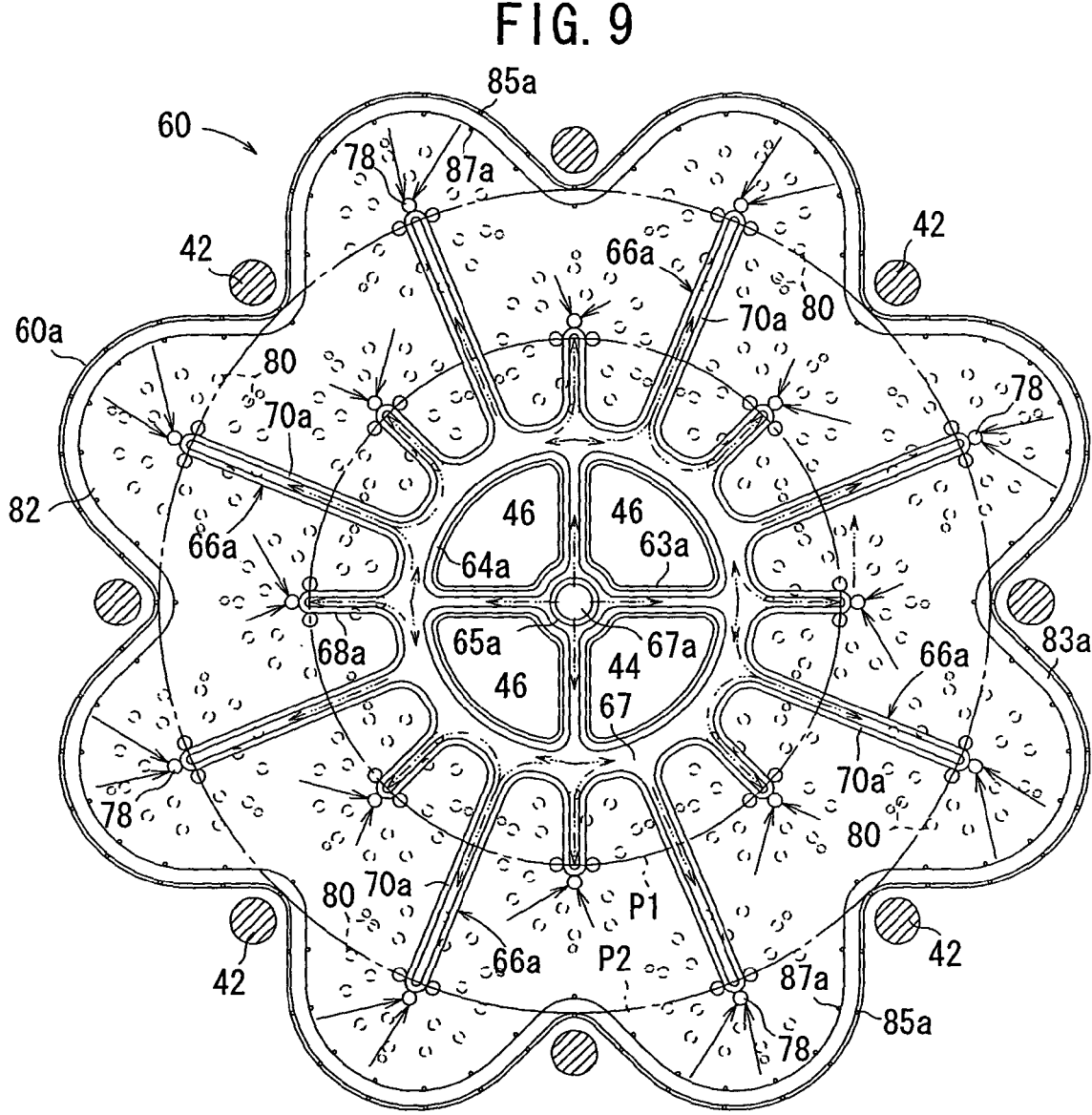
FIG. 9 is a front view showing a plate of the separator.

As shown in FIGS. 6, 7, and 9, ribs 63a are provided around the center of the plate (first plate) 60 to form the fuel gas supply hole 44 and the four discharge passages 46. The plate 60 has four inner ridges (first ridges) 64a around the respective discharge passages 46. The inner ridges 64a protrude toward the plate (second plate) 62. The plate 60 has a protrusion (first protrusion) 65a around the fuel gas supply hole 44. The protrusion 65a protrudes away from the plate 62 in a direction opposite to the inner ridges 64a.

An outer ridge 66a (first ridges) is formed radially outwardly around the fuel gas supply hole 44 on the plate 60. A fuel gas channel 67 is formed inside (between) the inner ridges 64a and the outer ridge 66a. The fuel gas channel 67 is connected to the fuel gas supply hole 44 through fuel gas distribution passages 67a. Each of the fuel gas distribution passages 67a extends between the discharge passages 46 along the rib 63a, i.e., along a surface of the separator 58, in a direction indicated by an arrow B, i.e., perpendicularly to the stacking direction for connecting the fuel gas supply hole 44 and the fuel gas supply channel 67.

The outer ridge 66a includes a plurality of first walls 68a and second walls 70a each extending radially outwardly by a predetermined distance. The first walls 68a and the second walls 70a are formed alternately. As shown in FIG. 9, each of the first walls 68a extends to an inner circle P1 which is a virtual line passing through centers of eight inner electrolyte electrode assemblies 56. Each of the second walls 70a extends to an outer circle P2 which is a virtual line passing through centers of eight outer electrolyte electrode assemblies 56. The eight inner electrolyte electrode assemblies 56 are arranged along the inner circle P1, and the eight outer electrolyte electrode assemblies 56 are arranged along the outer circle P2.

At each end portion of the first walls 68a and at each end portion of the second walls 70a, three oxygen-containing gas inlets 78 are formed. The oxygen-containing gas inlets 78 are formed to pass through the plate 60. The plate 60 has first bosses 80 protruding toward, and contact the electrolyte electrode assemblies 56 arranged along the inner circle P1 and the outer circle P2.

Figure 8:
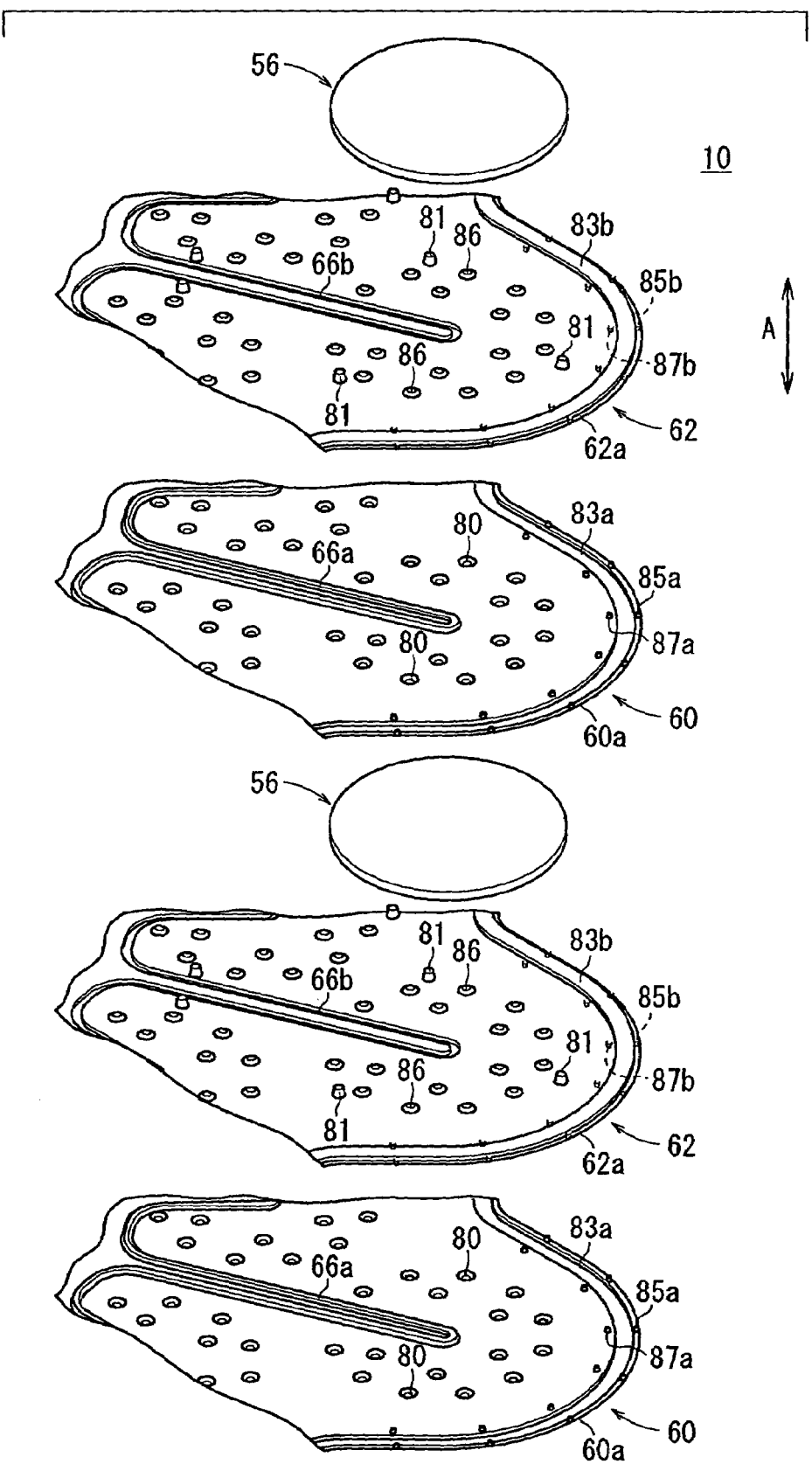
FIG. 8 is an enlarged perspective view showing a part of the fuel cell.

As shown in FIGS. 6, 8, and 9, a first curved circumferential ridge 83a is formed on the plate 60 along the curved outer section 60a. The first circumferential ridge 83a has the shape identical to the curved outer section 60a, and protrudes away from the plate 62. Outer projections 85a and inner projections 87a are provided at predetermined intervals on opposite sides of the first circumferential ridge 83a to face each other.

Figure 10:
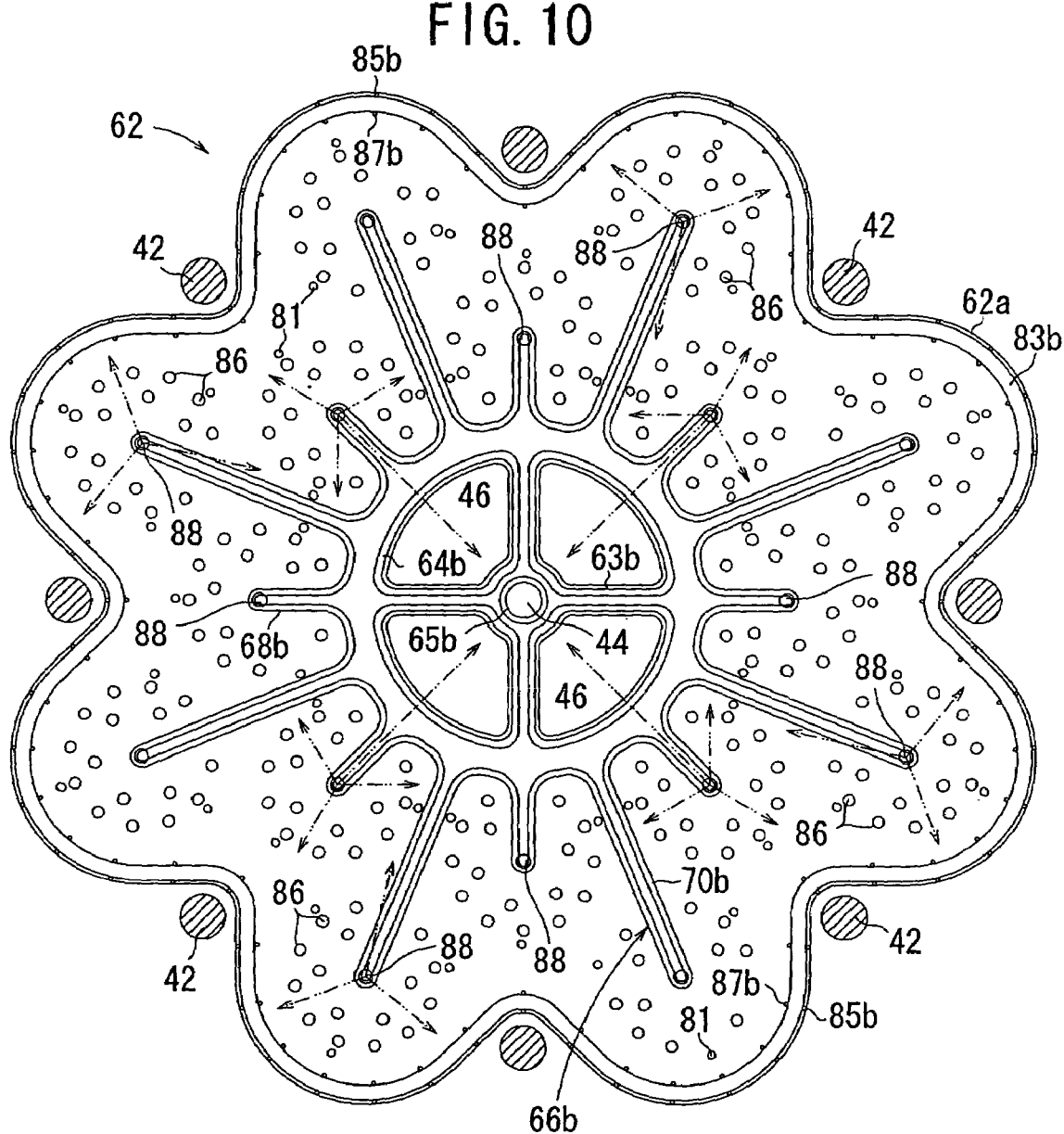
FIG. 10 is a front view showing the other plate of the separator.

As shown in FIGS. 6, 7, and 10, ribs 63b facing the ribs 63a are provided around the center of the plate 62. The plate 62 has four inner ridges 64b (second ridges) protruding toward the plate 60, and a protrusion (second protrusion) 65b protruding away form the plate 60. When the plates 60, 62 are connected together, a space extending through the protrusions 65a, 65b protruding away from each other forms the fuel gas supply hole 44.

An outer ridge (second ridge) 66b protruding toward the outer ridge 66a of the plate 60 is formed on the plate 62. The inner ridges 64a contact the inner ridges 64b, and the outer ridge 66a contact the outer ridge 66b to form the fuel gas channel 67 between the plate 60 and the plate 62. The fuel gas channel 67 is connected to the fuel gas supply hole 44 through the fuel gas distribution passages 67a. The outer ridge 66b includes a plurality of first walls 68b and second walls 70b each extending radially outwardly by a predetermined distance. The first walls 68b and the second walls 70b are formed alternately.

Further, the plate 62 has second bosses 86 protruding toward, and contact the electrolyte electrode assemblies 56 arranged along the inner circle P1 and the outer circle P2. The second bosses 86 have small dimensions (height and diameter) in comparison with the first bosses 80. Fuel gas inlets 88 are formed to pass through the plate 62. The fuel gas inlets 88 are connected to the fuel gas channel 67.

Protrusions 81 for positioning the eight electrolyte electrode assemblies 56 along the inner circle P1 and the eight electrolyte electrode assemblies 56 along the outer circle P2 are provided on the plate 62. At least three protrusions 81 are formed for each of the electrolyte electrode assemblies 56. In the first embodiment, three protrusions 81 are formed for positioning one electrolyte electrode assembly 56, for example. When the electrolyte electrode assembly 56 is positioned inside the protrusions 81, there is some clearance between the protrusions 81 and the electrolyte electrode assembly 56. The height of the protrusions 81 is greater than the height of the second bosses 86 (see FIG. 6).

As shown in FIGS. 6, 8, and 10, a second circumferential ridge 83b is formed on the plate 62 along the curved outer section 62a. The second circumferential ridge 83b has the shape identical to the curved outer section 62a, and protrudes away from the plate 60. Outer projections 85b and inner projections 87b are provided at predetermined intervals on opposite sides of the second circumferential ridge 83b to face each other, or in a zigzag pattern.

The fuel gas channel 67 is surrounded by the inner ridges 64a, 64b, and the outer ridges 66a, 66b between the plate 60 and the plate 62. An oxygen-containing gas channel 82 is formed outside the outer ridges 66a, 66b between the plate 60 and the plate 62 (see FIG. 11). The oxygen-containing gas channel 82 is connected to the oxygen-containing gas inlets 78 formed on the plate 60.

As shown in FIG. 6, the separator 58 has an insulator seal 90 for sealing the fuel gas supply hole 44. The insulator seal 90 is formed by placing a ceramics plate, or thermal spraying ceramics to the protrusion 65a of the plate 60 or the projection 65b of the plate 62. The first circumferential ridge 83a of the plate 60 and the second circumferential ridge 83b of the plate 62 protrude away from each other, and forms an space between the first circumferential ridge 83a and the second circumferential ridge 83b as a part of the oxygen-containing gas channel 82. An insulator seal 92 formed of ceramics or the like is provided on the first circumferential ridge 83a or the second circumferential ridge 83b by sandwiching the insulator seal 92 between the first circumferential ridge 83a and the second circumferential ridge 83b or by thermal spraying.

As shown in FIGS. 5 and 6, the electrolyte electrode assemblies 56 are interposed between the plate 60 of one separator 58 and the plate 62 of the other separator 58. Specifically, the plate 60 and the plate 62 outside the electrolyte electrode assemblies 56 has the first bosses 80 and the second bosses 86 protruding toward the electrolyte electrode assemblies 56 for sandwiching the electrolyte electrode assemblies 56.

Figure 11:
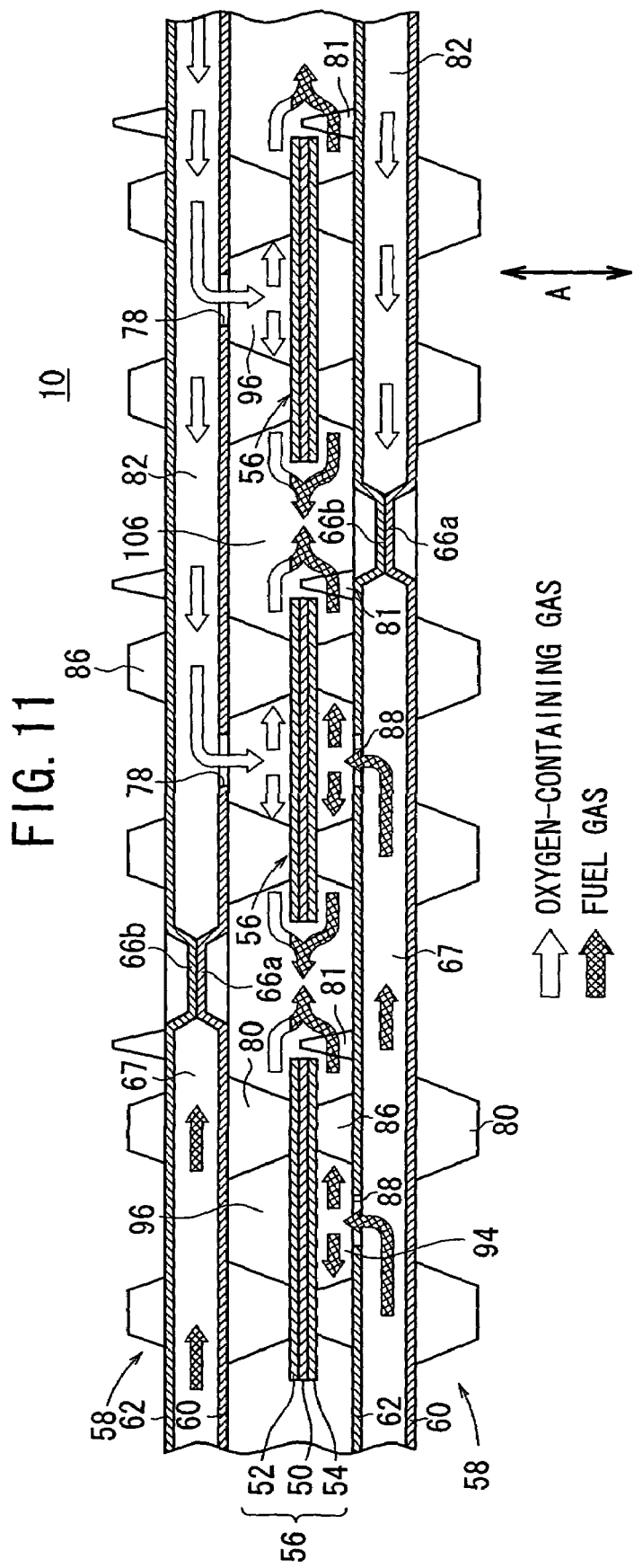
FIG. 11 is a view showing operation of the fuel cell.

As shown in FIG. 11, a fuel gas flow passage 94 connected to the fuel gas channel 67 through the fuel gas inlets 88 is formed between the electrolyte electrode assemblies 56 and the plate 62 of the separator 58. Further, an oxygen-containing gas flow passage 96 connected to the oxygen-containing gas channel 82 through the oxygen-containing gas inlets 78 is formed between the electrolyte electrode assemblies 56 and the plate 60 of the other separator 58 on the opposite side. The size of the opening of the fuel gas flow passage 94 depends on the height of the second bosses 86. The size of the opening of the oxygen-containing gas flow passage 96 depends on the height of the first bosses 80. The flow rate of the fuel gas is smaller than the flow rate of the oxygen-containing gas. Therefore, the dimensions of the second bosses 86 are smaller than the dimensions of the first bosses 80.

As shown in FIG. 6, the fuel gas channel 67 is connected to the fuel gas supply hole 44 extending through the protrusions 65a, 65b of the separator 58. The oxygen-containing gas channel 82 and the fuel gas channel 67 are formed on the same area inside the separator 58. The oxygen-containing gas channel 82 is open to the outside through the spacing between the first and second circumferential ridges 83a, 83b of the plates 60, 62 of the separator 58.

Each of the separators 58 stacked in the stacking direction has the first bosses 80 and the second bosses 86 for sandwiching the electrolyte electrode assemblies 56. The first bosses 80 and the second bosses 86 function as current collectors. The outer ridge 66a of the plate 60 is in contact with the outer ridge 66b of the plate 62, and the inner ridges 64a of the plate 60 is in contact with the inner ridges 64b of the plate 62 for serially connecting the fuel cells 10 in the direction indicated by the arrow A.

As shown in FIGS. 1 and 2, the fuel cells 10 are stacked in the direction indicated by the arrow A. End plates 97a, 97b are stacked on the outermost fuel cells 10 at opposite ends. Insulator plates 98a, 98b are stacked on the outside of the end plates 97a, 97b, respectively, and flanges 40a, 40b are stacked on the outside of the insulator plates 98a, 98b, respectively. The flanges 40a, 40b have holes 100a, 100b at positions corresponding to the inward curves of the curved outer sections 60a, 62a of the plates 60, 62. Tightening bolts 42 are inserted in the holes 100a, 100b. Ends of the tightening bolts 42 are screwed into nuts 104 for tightening the fuel cells 10 together with a suitable force.

Next, operation of the fuel cell stack 12 will be described below.

In assembling the fuel cell 10, the plate 60 and the plate 62 are connected together to form the separator 58. Specifically, as shown in FIG. 6, the outer ridge 66a and the inner ridges 64a of the plate 60 are connected to the outer ridge 66b and the inner ridges 64b of the plate 62 by brazing, and the ring-shaped insulator seal 90 is provided on the plate 60 or the plate 62 around the fuel gas supply hole 44 by thermal spraying, for example. Further, the insulator seal 92 having curves is provided on the first circumferential edge 83a of the plate 60 or the second circumferential edge 83b of the plate 62 by thermal spraying, for example.

The separator 58 thus formed has the fuel gas channel 67 and the oxygen-containing gas channel 82 on the same area between the plate 60 and the plate 62. The fuel gas channel 67 is connected to the fuel gas supply hole 44 through the fuel gas distribution passage 67a, and the oxygen-containing gas channel 82 between the curved outer section 60a and the curved outer section 62a is open to the outside.

Then, the electrolyte electrode assemblies 56 are interposed between a pair of separators 58. As shown in FIGS. 4 and 5, sixteen electrolyte electrode assemblies 56 are interposed between the plate 60 of one separator 58 and the plate 62 of the other separator 58. Eight electrolyte electrode assemblies 56 are arranged along the inner circle P1, and eight electrolyte electrode assemblies 56 are arranged along the outer circle P2.

Three protrusions 81 are provided for positioning each of the electrolyte electrode assemblies 56. The electrolyte electrode assembly 56 is placed inside the three protrusions 81. The first bosses 80 of the plate 60 and the second bosses 86 of the plate 62 protrude toward, and contact the electrolyte electrode assembly 56 inside the protrusions 81.

As shown in FIG. 11, the oxygen-containing gas flow passage 96 is formed between the cathodes 52 of the electrolyte electrode assemblies 56 and the plate 60. The oxygen-containing gas flow passage 96 is connected to the oxygen-containing gas channel 82 through the oxygen-containing gas inlets 78. The fuel gas flow passage 94 is formed between the anodes 54 of the electrolyte electrode assemblies 56 and the plate 62. The fuel gas flow passage 94 is connected to the fuel gas channel 67 through the fuel gas inlets 88. An exhaust gas channel 106 is formed between the separators 58 for guiding the exhaust gas (mixed gas of the fuel gas and the oxygen-containing gas after reaction) to the discharge passages 46.

A plurality of the fuel cells 10 as assembled above are stacked in the direction indicated by the arrow A to form the fuel cell stack 12 (see FIGS. 1 and 2).

The fuel gas such as a hydrogen-containing gas is supplied to the fuel gas supply hole 44 of the flange 40b, and the oxygen-containing gas such as air is supplied from the outside of the fuel cells 10 under pressure. The fuel gas supplied to the fuel gas supply hole 44 flows in the stacking direction indicated by the arrow A, and is supplied to the fuel gas distribution passages 67a formed in each of the separators 58 of the fuel cells 10 (see FIG. 6).

As shown in FIG. 5, the fuel gas flows through the fuel gas channel 67 along the first walls 68a, 68b and the second walls 70a, 70b of the outer ridges 66a, 66b. The fuel gas flows into the fuel gas flow passage 94 through the fuel gas inlets 88 formed at end portions of the first walls 68a, 68b and the second walls 70a, 70b, i.e., at positions corresponding to central regions of the anodes 54 of the electrolyte electrode assemblies 56. The fuel gas supplied to the fuel gas flow passage 94 flows outwardly from the central regions of the anodes 54 (see FIG. 11).

The oxygen-containing gas is supplied to each of the fuel cells 10 from the outside. The oxygen-containing gas is supplied to the oxygen-containing gas channel 82 formed in each of the separators 58, between the plate 60 and the plate 62. The oxygen-containing gas supplied to the oxygen-containing gas channel 82 flows into the oxygen-containing gas flow passage 96 from the oxygen-containing gas inlets 78, and flows outwardly from central regions of the cathodes 52 of the electrolyte electrode assemblies 56 (see FIGS. 5 and 11).

Therefore, in each of the electrolyte electrode assemblies 56, the fuel gas is supplied to the central region of the anode 54, and flows outwardly from the central region of the anode 54. Similarly, the oxygen-containing gas is supplied to the central region of the cathode 52, and flows outwardly from the central region of the cathode 52. The oxygen-ion passes from the cathode 52 to the anode 54 through the electrolyte 50 to generate electricity by electrochemical reactions.

The electrolyte electrode assemblies 56 are sandwiched between the first bosses 80 and the second bosses 86. Therefore, the first bosses 80 and the second bosses 86 function as current collectors. The fuel cells 10 are electrically connected in series in the stacking direction indicated by the arrow A. The electricity can be outputted from the output terminals 48a, 48b. Even if some of the electrolyte electrode assemblies 56 have power failures, the fuel cell stack 12 can be energized by the other electrolyte electrode assemblies 56. Therefore, the power generation can be performed reliably.

After reaction of the fuel gas and the oxygen-containing gas, the exhaust gas moves outwardly from the central regions of the electrolyte electrode assemblies 56 through the exhaust gas channel 106 between the separators 58, and flows toward the center of the separators 58. The exhaust gas flows into the four discharge passages 46 formed near the center of separators 58 as an exhaust gas manifold, and is discharged from the discharge passages 46 to the outside.

In the first embodiment, a plurality of (e.g., 16) circular electrolyte electrode assemblies 56 having a relatively small diameter are provided between a pair of separators 58. Thus, the electrolyte electrode assemblies 56 can be thin, and the resistance polarization is reduced. Further, temperature distribution is small, and damages due to heat stress are prevented. Therefore, the power generation performance of the fuel cells 10 is effectively improved.

Further, the eight inner electrolyte electrode assemblies 56 are arranged along the inner circle P1, and the eight outer electrolyte electrode assemblies 56 are arranged along the outer circle P2. The inner circle P1 and the outer circle P2 are concentric with the fuel gas supply hole 44 positioned at the center of the separators 58. The eight outer eight electrolyte electrode assemblies 56 are positioned out of radial alignment with the eight inner electrolyte electrode assemblies 56. Stated otherwise, the inner electrolyte electrode assemblies 56 and the outer electrolyte electrode assemblies 56 are arranged alternately along the inner circle P1 and the outer circle P2, respectively.

The electrolyte electrode assemblies 56 can be arranged between the separators 58 densely. Thus, the overall fuel cell 10 can be made compact, while maintaining the desired power generation performance.

In the first embodiment, the fuel gas supply hole 44 extends through the separators 58 for supplying the fuel gas in the stacking direction. Further, the discharge passages 46 are formed around the fuel gas supply hole 44, and extend through the separators 58 for discharging the fuel gas and the oxygen-containing gas after reaction as an exhaust gas in the stacking direction. Each of the fuel gas distribution passages 67a extends between the discharge passages 46 along a surface of the separator 58 (in the direction indicated by the arrow B), perpendicularly to the stacking direction for connecting the fuel gas supply hole 44 and the fuel gas channel 67.

Thus, the fuel gas for reaction in the electrode electrolyte assemblies 56 is supplied through the fuel gas supply hole 44 in the stacking direction. The fuel gas from the fuel gas supply hole 44 flows into the fuel gas channel 67 through the fuel gas distribution passages 67a in each of the separators 58.

When the leakage of the fuel gas occurs in the fuel gas supply hole 44, the leaked fuel gas enters the discharge passages 46 around the fuel gas supply hole 46, and does not move undesirably into the oxygen-containing gas channel 82, for example. The cross leakage of the fuel gas is reliably prevented. Therefore, the reaction of the fuel gas and the oxygen-containing gas which causes local heat generation does not occur. Thus, the electrolyte electrode assemblies 56 are not thermally damaged. If a fuel gas sensor for detecting the fuel gas is provided in the discharge passage 46, for example, the leakage of the fuel gas can be detected reliably with the simple structure.

The fuel gas flows through the fuel gas supply hole 44 inside of the discharge passages 46. Since the hot exhaust gas flows through the discharges passages 46, the fuel gas is heated by the waste heat of the hot exhaust gas. The heated fuel gas flows through the fuel gas flow passage 94, and is supplied to the anode 54. This structure is particularly suitable for rapidly starting the reaction in the electrolyte electrode assemblies 56 at the time of starting the operation of the fuel cell 10, and internal reforming of the fuel gas.

The discharge passages 46 extend through a central region of the separators 58. Therefore, the heat of the hot discharge passages 46 is not emitted wastefully from the outer region of the separators 58. The heat of the hot discharge passage 46 is transmitted to the entire separators 58 from the central region of the separators 58. Thus, the temperature distribution is uniform in each of the separators 58. Simply by providing seals around the discharge passages 46, the sealing characteristics of the fuel cell 10 are improved efficiently. Therefore, the sealing structure is simple. Since the exhaust gas flows through only the central region of the separators 58, turbulence in the flow of the exhaust gas does not occur, and the exhaust gas is smoothly discharged from the fuel cell 10.

The fuel gas supply hole 44 extends through the central region of the separators 58. Therefore, the fuel gas is uniformly supplied to each of the electrolyte electrode assemblies 56. Thus, the desirable power generation performance is suitably maintained.

Further, the discharge passages 46 are connected to the exhaust gas channel 106 formed between the separators 58 at a position adjacent to the fuel gas channel 67 and the oxygen-containing gas channel 82 (see FIG. 11). Thus, the layout of the fuel cell 10 is simple, and the dimension of the fuel cell 10 in the stacking direction is effectively reduced. The exhaust gas channel 106 is adjacent to the fuel gas channel 67 and the oxygen-containing gas channel 82. Therefore, the heat exchanges between the hot exhaust gas and the fuel gas, and between the hot exhaust gas and the oxygen-containing gas are suitably performed.

The protrusion 65a is formed on the plate 60, and the protrusion 65b is formed on the plate 62. The protrusion 65a and the protrusion 65b protrude away from each other such that the fuel gas supply hole 44 extend through a space between the protrusion 65a and the protrusion 65b. Further, the plate 60 includes the inner ridge 64a and the outer ridge 66a, and the plate 62 includes the inner ridges 64b and the outer ridge 66b. The inner ridges 64a and the outer ridge 66a protrude oppositely to the protrusion 65a. The inner ridges 64b and the outer ridge 66b protrude oppositely to the protrusion 65b. The inner ridges 64a are in contact with the inner ridges 64b, and the outer ridge 66a is in contact with the outer ridge 66b for forming the fuel gas channel 67 and the fuel gas distribution passages 67a between the plate 60 and the plate 62.

The fuel gas supply hole 44, the fuel gas distribution passage 67a, and the fuel gas channel 67 are formed only by the plates 60, 62 of the separators 58. Thus, the production of the fuel cell 10 is simply performed. Since dedicated pipes or the like are not needed, the number of components of the fuel cell 10 is small, and the number of steps for forming the plates 60, 62 can be reduced.

Further, the heights of the protrusions 65a, 65b, the inner ridges 64a, 64b, and the outer ridges 66a, 66b can be small. Stated otherwise, when the plates 60, 62 are formed under pressure, the amount of drawing for each of the protrusions 65a, 65b, the inner ridges 64a, 64b, and the outer ridges 66a, 66b is small. Therefore, the plates 60, 62 can be formed with a high degree of accuracy.

The protrusion 65a protrudes from the plate 60 oppositely to the inner ridges 64a, and the protrusion 65b protrudes from the plate 62 oppositely to the inner ridges 64b. Therefore, the protrusions 65a, 65b are in contact with each other with a high degree of rigidity. The space of the fuel gas supply hole 44 is not deformed. The amount of the fuel gas supplied to the electrolyte electrode assemblies 56 is constant. Further, the sealing characteristics are improved. Thus, the desired power generation performance is maintained.

Next, the operation of the fuel cell stack 12 used in the gas turbine 14 shown in FIG. 3 will be described briefly.

As shown in FIG. 3, in starting the operation of the gas turbine 14, the combustor 18 is energized to spin the turbine 24, and energize the compressor 26 and the power generator 28. The compressor 26 functions to guide the external air into the supply passage 34. The air is pressurized and heated to a predetermined temperature (e.g., 200° C.), and supplied to the second passage 36 of the heat exchanger 22.

A hot exhaust gas as a mixed gas of the fuel gas and the oxygen-containing gas after reaction is supplied to the first passage 32 of the heat exchanger 22 for heating the air supplied to the second passage 36 of the heat exchanger 22. The heated air flows through the hot air supply passage 38, and supplied to the fuel cells 10 of the fuel cell stack 12 from the outside. Thus, the power generation is performed by the fuel cells 10, and the exhaust gas generated by the reaction of the fuel gas and the oxygen-containing gas is discharged into the chamber 20 in the casing 16.

At this time, the temperature of the exhaust gas discharged from the fuel cells (solid oxide fuel cells) 10 is high, in the range of 800° C. to 1000° C. The exhaust gas spins the turbine 24 for generating electricity by the power generator 28. The exhaust air is supplied to the heat exchanger 22 for heating the external air. Therefore, it is not necessary to use the combustor 18 for spinning the turbine 24.

The hot exhaust gas in the range of 800° C. to 1000° C. can be used for internally reforming a fuel supplied to the fuel cell stack 12. Therefore, various fuels such as natural gas, butane, and gasoline can be used for the internal reforming.

Figure 12:
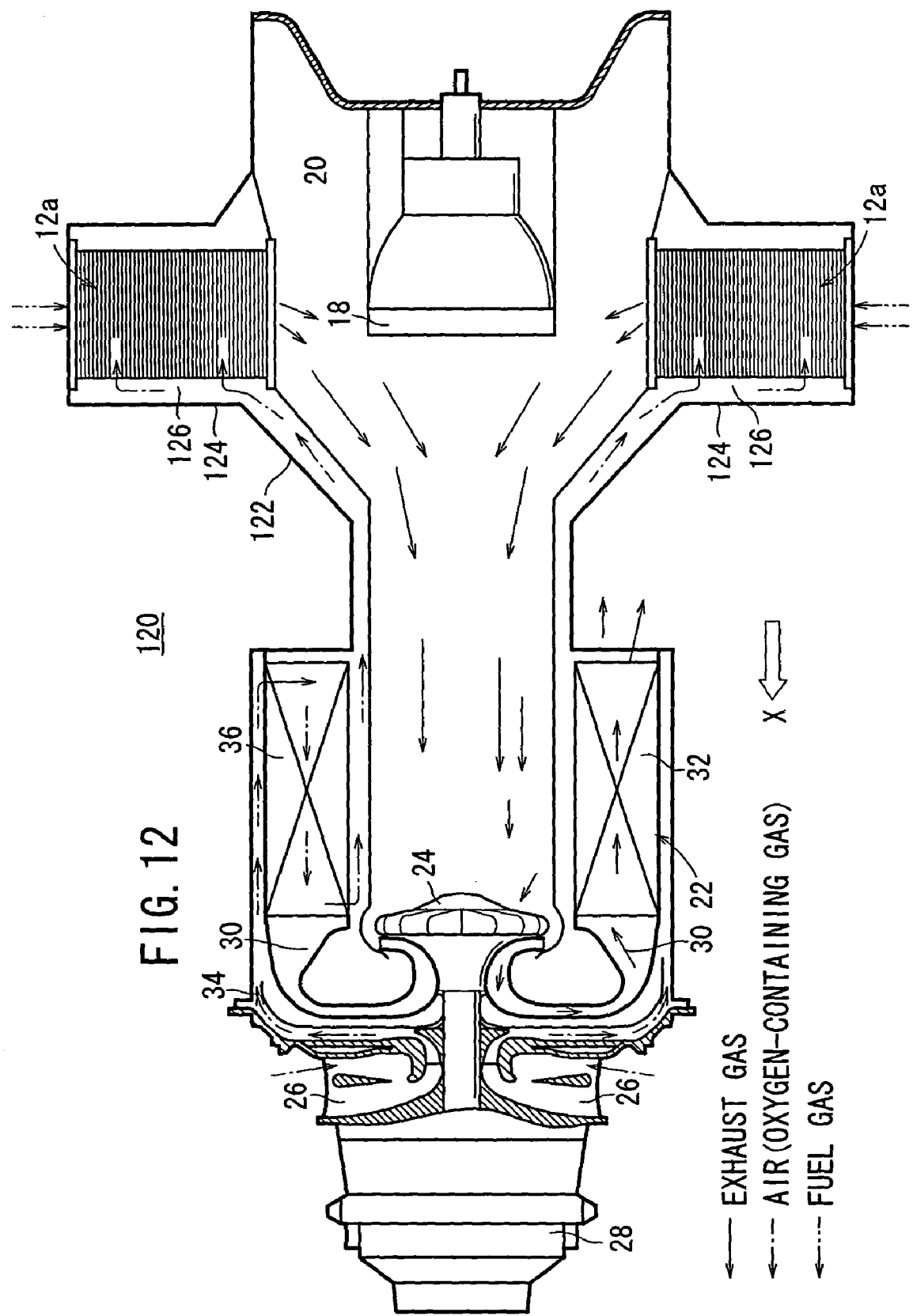
FIG. 12 is a cross sectional view schematically showing a gas turbine including relatively small fuel cell stacks according to a second embodiment of the present invention.
Figure 13:
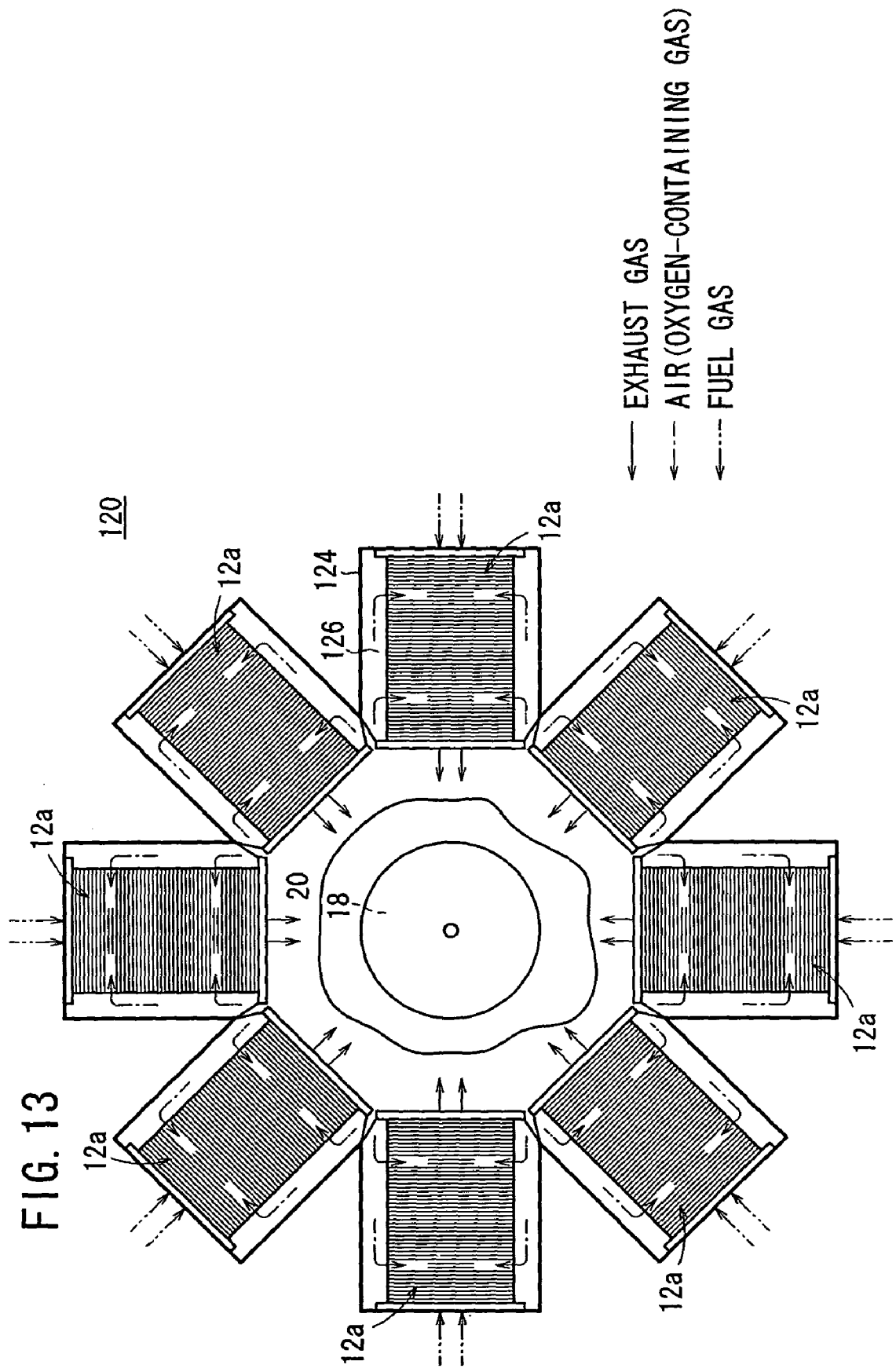
FIG. 13 is a front view showing the gas turbine.

FIG. 12 is a cross sectional view schematically showing a gas turbine 120 including relatively small fuel cell stacks 12a according to a second embodiment of the present invention, and FIG. 13 is a front view showing the gas turbine 120. The constituent elements that are identical to those of the gas turbine 14 according to the first embodiment are labeled with the same reference numeral, and description thereof is omitted. Similarly, in a third embodiment as described later, the constituent elements that are identical to those of the gas turbine 14 according to the first embodiment are labeled with the same reference numeral, and description thereof is omitted.

In a casing 122 of the gas turbine 120, eight fuel cell stacks 12a are provided around a combustor 18 at intervals of 45°. Each of the fuel cell stacks 12a is covered by a cover 124, and a hot air supply passage 126 is formed inside the cover 124.

As described above, in the casing 122 of the gas turbine 120, eight fuel cell stacks 12a are provided around the combustor 18 at intervals of 45°. Thus, a large electromotive force is generated while the overall length of the gas turbine 120 is short.

Figure 14:
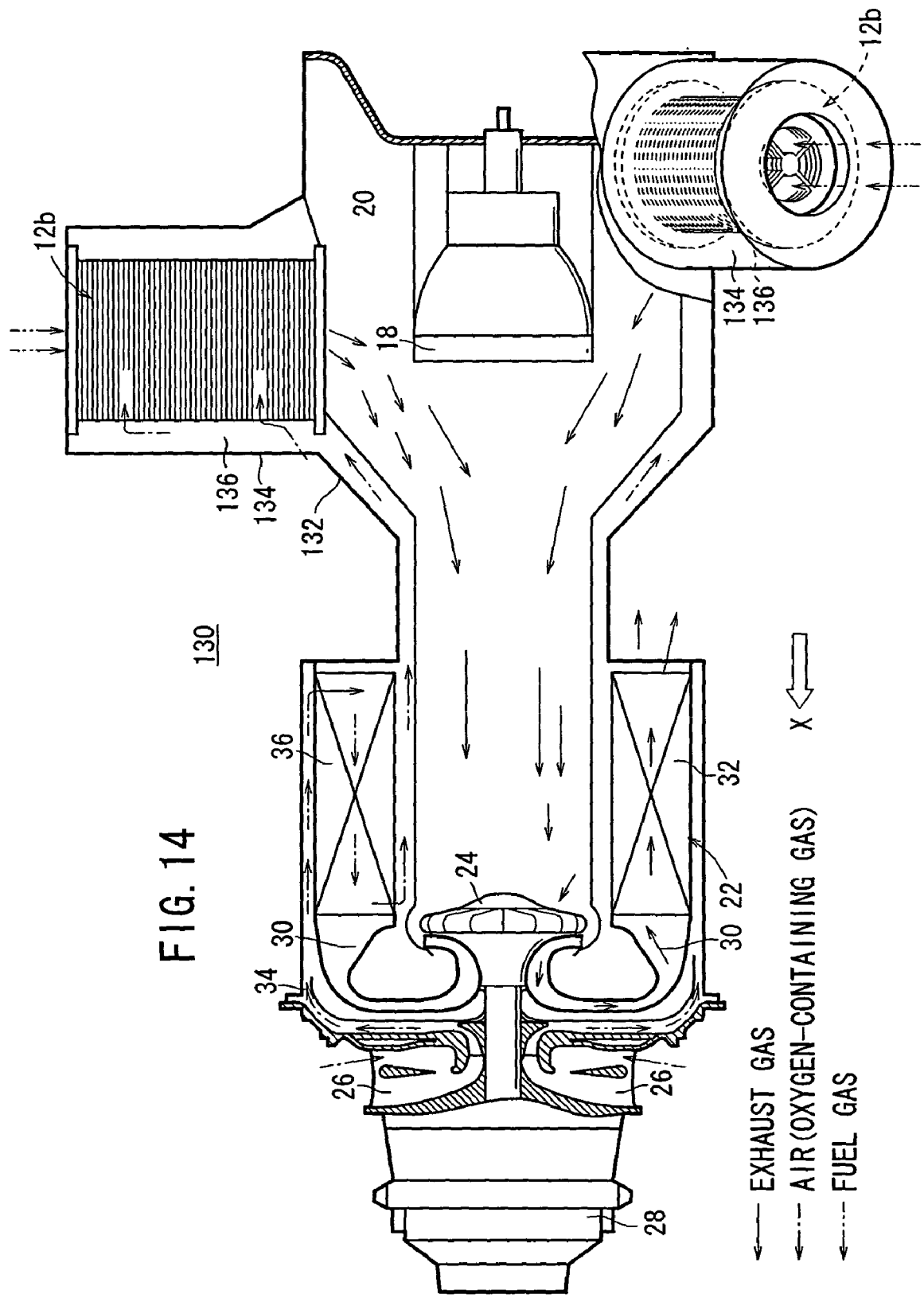
FIG. 14 is a cross sectional view schematically showing a gas turbine including relatively large fuel cell stacks according to a third embodiment of the present invention.
Figure 15:
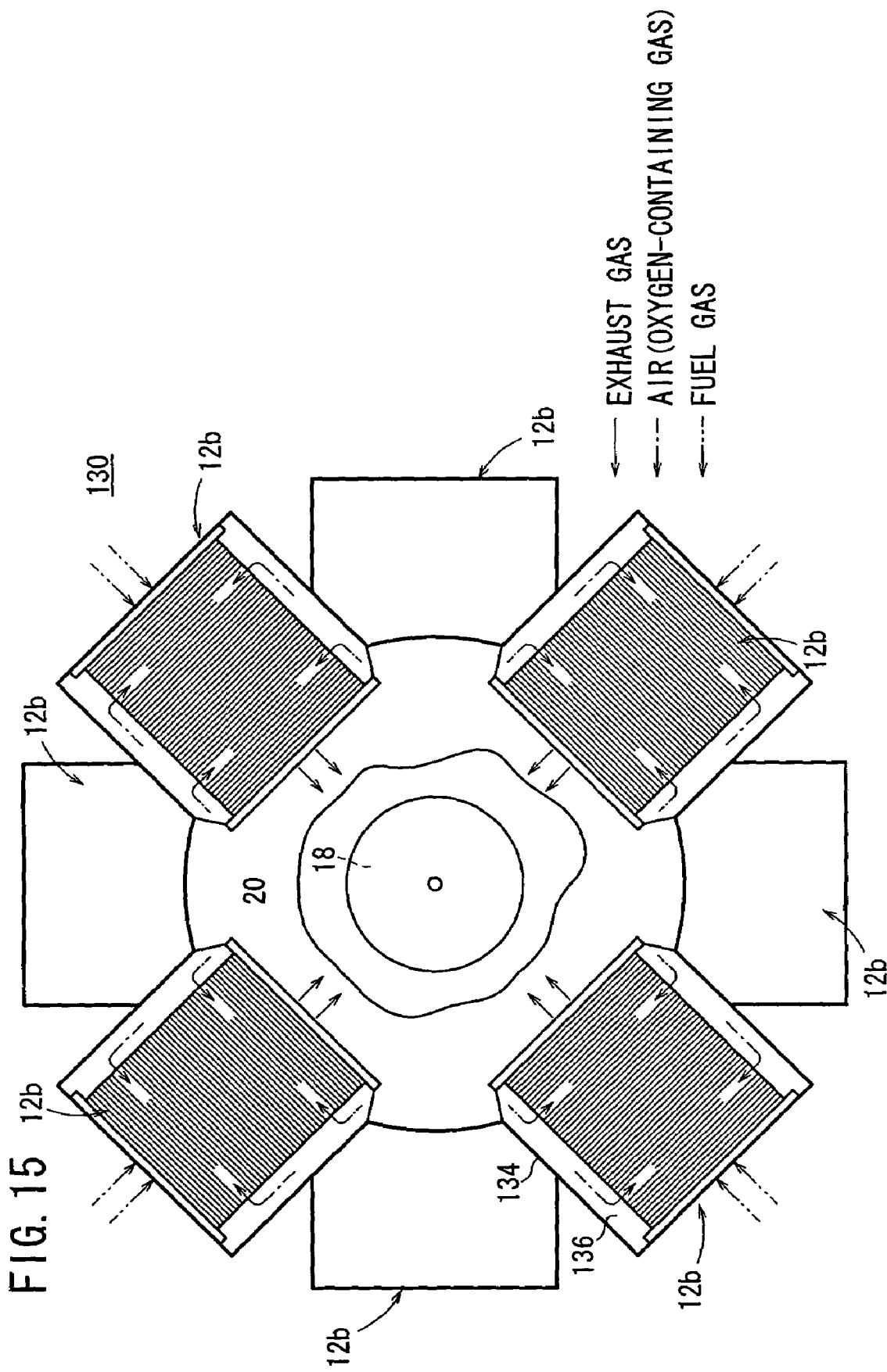
FIG. 15 is a front view showing the gas turbine.
Figure 16:
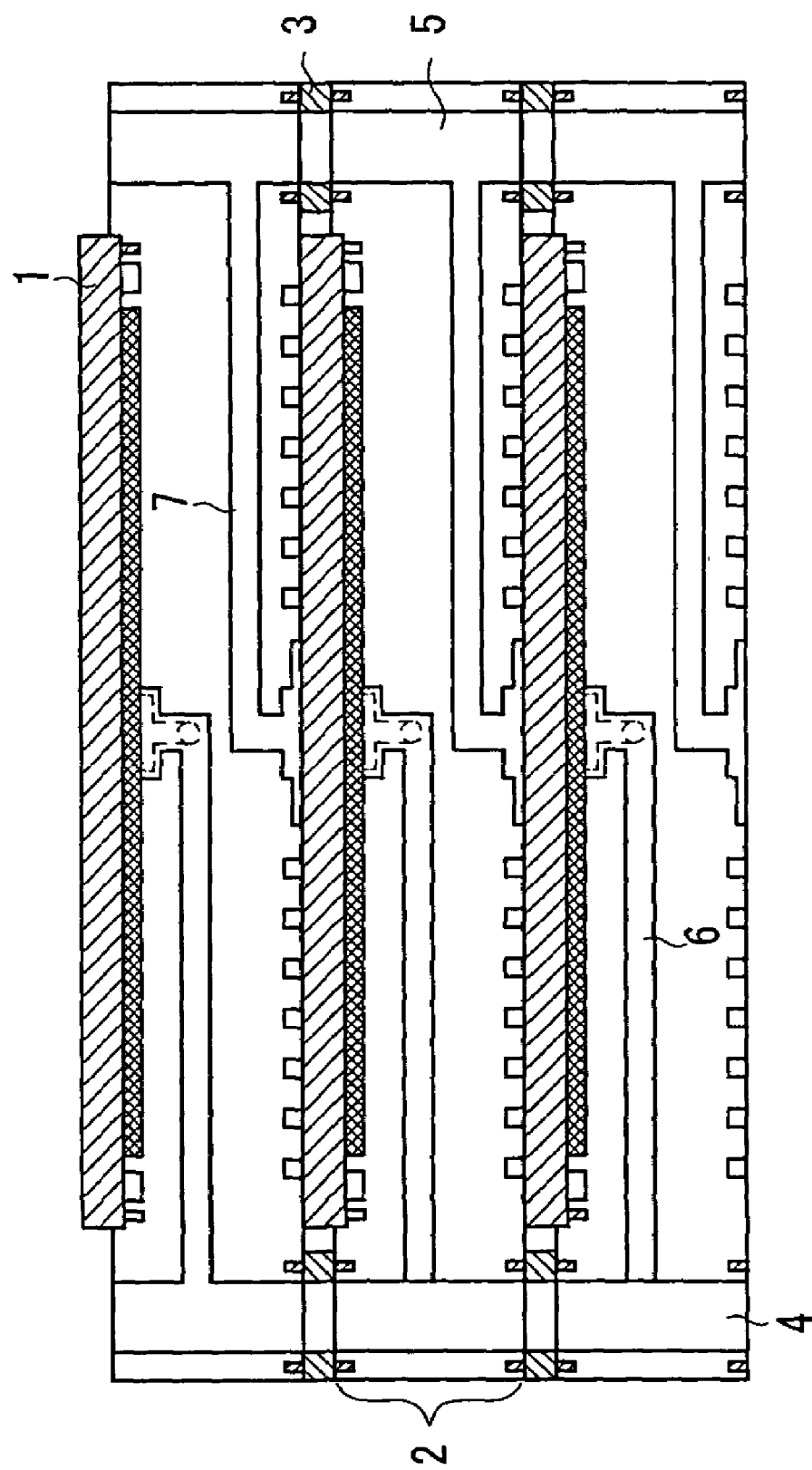
FIG. 16 is an exploded perspective view showing a conventional fuel cell system (prior art 2).

FIG. 14 is a cross sectional view schematically showing a gas turbine 130 including relatively large fuel cell stacks 12b according the third embodiment of the present invention, and FIG. 15 is a front view showing the gas turbine 130.

In the gas turbine 130, four fuel cell stacks 12b are arranged along a first circle in the casing 132 at intervals of 90° and four fuel cell stacks 12b are arranged along a second circle in the casing 132 at intervals of 90°. The first circle is spaced from the second circle at a predetermined distance in an axial direction of the casing 132 indicated by an arrow X. Orientation of the four fuel cell stacks 12b arranged along the first circle is shifted by 45° from the second fuel cell stacks 12b arranged along the second circle. Therefore, the fuel cell stacks 12b do not contact with each other. Each of the fuel cell stacks 12b is covered by a cover 134, and a hot air supply passage 136 is formed inside the cover 134.

In the gas turbine 130, the four fuel cells stacks 12b are disposed at intervals of 90° along the first circle, and the additional four fuel cell stacks 12b are disposed at intervals of 90° along the second circle. The orientation of the fuel cell stacks 12b along the first circle is shifted by 45° form the fuel cell stacks 12b arranged along the second circle. Thus, a large number of (eight) fuel cell stacks 12b having a relatively large size can be placed in the gas turbine 130 for improving the power generation efficiency. The outer circumferential dimension of the gas turbine 130 is not large, and the gas turbine 130 is compact.

In the first through third embodiments, the fuel cell stacks 12, 12a, 12b are used in the gas turbines 14, 120, and 130. However, the fuel cell stacks 12, 12a, 12b can be used in other applications. For example, the fuel cell stacks 12, 12a, 12b can be mounted on vehicles.

According to the fuel cell of the present invention, when the leakage of the fuel gas occurs in the fuel gas supply hole, the leaked fuel gas enters the discharge passages around the fuel gas supply hole, and does not move undesirably into the oxygen-containing gas channel. Therefore, the reaction of the fuel gas and the oxygen-containing gas which causes local heat generation does not occur. Thus, the electrolyte electrode assemblies are not thermally damaged. If a fuel gas sensor for detecting the fuel gas is provided in the discharge passage, for example, the leakage of the fuel gas can be detected reliably with the simple structure.

The fuel gas flows through the fuel gas supply hole inside of the discharge passages. Since the hot exhaust gas flows through the discharges passages, the fuel gas is heated by the waste heat of the hot exhaust gas. The heated fuel gas flows through the fuel gas flow passage, and is supplied to the anode. This structure is particularly suitable for rapidly starting the reaction in the electrolyte electrode assemblies at the time of starting the operation of the fuel cell, and internal reforming of the fuel gas.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising a pair of separators and electrolyte electrode assemblies interposed between said separators, said electrolyte electrode assemblies each including an anode, a cathode, and an electrolyte interposed between said anode and said cathode, wherein each of said separators includes a first plate and a second plate stacked together in a stacking direction;

a fuel gas channel for supplying a fuel gas to said anode, and an oxygen-containing gas channel for supplying an oxygen-containing gas to said cathode are formed between said first and second plates;

a fuel gas supply hole extends through a center of a central region of said separators for supplying said fuel gas in said stacking direction;

discharge passages are formed around said fuel gas supply hole, and extend through said central region of said separators for discharging said fuel gas and said oxygen-containing gas after reaction as an exhaust gas in said stacking direction; and a fuel gas distribution passage extends between said discharge passages along a surface of said separator, perpendicularly to said stacking direction for connecting said fuel gas supply hole and said fuel gas channel.

2. A fuel cell according to claim 1, wherein said discharge passages are connected to an exhaust gas channel formed between said separators at a position adjacent to said fuel gas channel and said oxygen-containing gas channel.

3. A fuel cell according to claim 1, wherein a first protrusion is formed on said first plate, and a second protrusion is formed on said second plate, and said first protrusion and said second protrusion protrude away from each other such that said fuel gas supply hole extends through a space between said first protrusion and said second protrusion.

4. A fuel cell according to claim 3, wherein a seal for sealing said space is formed between said first protrusion formed on said first plate of one of said separators and said second protrusion formed on said second plate of the other of said separators.

5. A fuel cell according to claim 3, wherein said first plate includes a first ridge and said second plate includes a second ridge;

said first ridge and said second ridge protrude oppositely to said first protrusion and said second protrusion, respectively; and said first ridge and said second ridge are in contact with each other for forming said fuel gas channel and said fuel gas distribution passage.

6. A fuel cell according to claim 1, wherein said electrolyte electrode assemblies are arranged along at least one circle concentric with a central axis of said separators.

* * * * *